INVENTOR.
JAMES A. WEDIN
BY
Townsend and Townsend
ATTORNEYS

United States Patent Office 3,408,239
Patented Oct. 29, 1968

3,408,239
METHOD FOR MANUFACTURING GLASS FIBER REINFORCED RESIN IMPREGNATED MATS
James A. Wedin, Livermore, Calif., assignor to Coast Manufacturing & Supply Company, Livermore, Calif.
Filed June 11, 1965, Ser. No. 463,116
2 Claims. (Cl. 156—62.8)

ABSTRACT OF THE DISCLOSURE

A method for molding glass fiber reinforced material and a glass fiber product in which a resin preimpregnated glass fiber mat is placed in contact with a plurality of unidirectionally oriented glass fiber strands and heat and pressure applied so that the flow of the material prior to setting is primarily transverse to the orientation of the strands.

---

This invention relates to a product and method for manufacturing glass fiber reinforced resinous articles. More particularly, it relates to a product and method for manufacturing glass fiber reinforced resin impregnated articles by conventional molding processes, but where the direction of resin and fiber flow during the molding operation is controlled.

A great variety of light-weight articles having a high cross-sectional strength are currently made with molding resin compositions where strands of fiber glass are embedded in the mass for reinforcement. The articles are formed and shaped as desired by means of dies and molds which are used to apply heat and pressure to the resinous mass to make it conform to the shape of the die and to cure the resin.

The present invention provides a way of controlling the direction of flow of the resinous mass in the mold during the molding operation. This type of control is significant for at least two reasons. In some molding operations the mold employed does not present a barrier in all directions to the material being molded. In such a case where the resin is permitted to flow in random directions, some of the resin and reinforcement fibers will overflow the molds in the areas where there are no barriers with resultant waste and possible lack of homogeneous distribution of the resin and reinforcement in the remainder of the mold. With the present techniques, the resinous mass is caused to flow under heat and pressure as before, but is directed to those areas where empty mold or die spaces exist to receive and shape the flow and restricts significant flow to those areas that are barrier free.

The other area of consequence in which the present invention has advantageous application relates to those articles of fabrication having complex curvatures and other intricate shapes. In loading a die to provide such a product, it has been necessary to carefully fill all of the sections and crevices of the die with raw materials to assure that the raw material will reach all of these areas in sufficient volume during application of heat and pressure. With the prior materials and their uncontrolled random flow it was not possible to leave any substantial areas in the die vacant. With the present invention it is now possible to place materials to be molded in the die, and by properly orienting them, be assured that during application of heat and pressure adequate flow towards the empty parts of the die will occur.

These new results are achieved in accordance with the preferred embodiment of the present invention by employing a preimpregnated mat formed with a molding resin composition and a reinforcement of randomly oriented glass fibers therein. On this mat, at least one layer of a plurality of glass fiber strands are disposed in substantially parallel alignment. Preferably the strands in each layer are placed in closely spaced or abutting relationship but they could be spaced apart somewhat if desired. The strands are also preferably provided as a preimpregnated layer formed with the same or a compatible molding resin composition, although it is possible to use strands alone and rely upon the resin provided by the mat during molding.

One mat and one layer of parallel strands will achieve the desired result although in most instances a sandwich structure will be utilized so that a second mat is placed on top of the parallel strands and this alternating layer construction repeated as desired depending upon the thickness of the end product. Where plural layers of parallel strands are used, the strands in each layer are oriented in the same direction as the strands in the other layers and are parallel to each other. Further, each layer of parallel strands may be several strands thick with strands stacked upon other strands.

To achieve the desired flow, the mats and fibers are placed in the mold or die so that the area of the mold into which the flow is sought is positioned transverse to the longitudinal axes of the parallel strands. The longitudinal axes of the parallel strands therefore "point" approximately 90° away from the area in the die or mold that is to be filled by the flow. By applying heat and pressure to this configuration, the desired result is obtained.

The preimpregnated mats employed in this invention include chopped or continuous strands of fiber glass laid out at random within the mat and which provide the required cross-sectional strength in the end product. The unidirectionally aligned strands of fiber glass, which are preferably also resin preimpregnated, in turn control the direction of flow of the mat components during molding by preventing flow in the direction of their longitudinal axes and add strength to the article of manufacture along their axis of alignment. The resin composition of the mat and/or strand layer serves to bond the strands to adjacent mats to form an integral mass after molding.

It is believed that the principle of operation of the invention is as follows. Upon the application of heat and pressure to the composite sandwich of resin and glass fibers, the material being compressed tends to spread outwardly between the die or mold surfaces. The parallel fibers do not stretch or elongate appreciably in the direction of their longitudinal axes under the impetus of the heat and pressure. However, they can be readily moved apart transversely in a rolling or flowing movement. Since this is the path of least resistance, the flow and movement of the mass including the parallel fibers together with the resinous mass from the preimpregnated mats, is substantially entirely in the direction transverse to the longitudinal axes of the parallel strands. As a result, flow is controlled so that it is almost entirely in this one direction and occurs very little in the direction of the axes of the parallel strands. At the conclusion of the molding operation, the parallel strands will be in a more spaced-apart relationship than at the outset, although they will still be predominately in their parallel relationship.

Other objects and advantages of the present invention will become apparent upon reading the following specification and referring to the accompanying drawing in which similar characters of reference represent corresponding parts in each of the several views.

In describing the invention, reference will be made to the drawing in which.

Figure 1:
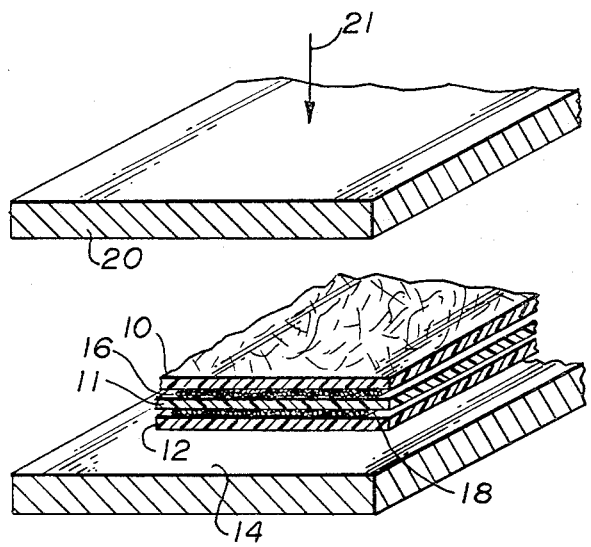
FIG. 1 is a fragmentary perspective view of a mold and the preimpregnated mats employed in a molding operation in accordance with this invention.

As illustrated in FIG. 1 of the drawings, in molding an article of a desired shape by the method embodying this invention, a plurality of preimpregnated mats 10, 11 and 12 are positioned on a molding plate or die 14. The mats 10, 11 and 12 are separated from each other by means of layers of substantially parallel glass fibers. Thus, a plurality of preimpregnated strands of glass fibers 16 is placed between the mats 10 and 11, and similarly, a plurality of preimpregnated strands of glass fibers 18 is placed between the mats 11 and 12. The strands 18 are illustrated as being only one fiber thick for simplicity but they can also be stacked on top of each other as desired to any desired thickness.

As is well-known in the art, preimpregnated mats, such as 10, 11 and 12, useful in this invention, may be made of a glass reinforced resin impregnated material. Any suitable type of molding resin such as polyester may be employed, while the conventional glass reinforcement comprises a plurality of strands or yarns of glass fibers. The glass fibers are randomly disposed within the mat and integrally formed therein, may be of varied lengths, and provide the required cross-sectional strength to the end product. The resin may include catalysts, fillers and other conventional components. Similar resins and fillers may be used with the parallel fiber layers.

The type of materials with respect to their physical properties may be varied over a great range depending on the requirements for the end product. In general, it is advantageous to use glass fibers preimpregnated with about 20%–80% resin content. If the viscosity of the resin is between about 20,000 and 20,000,000 cps., a substantially unidirectional flow of the mat during molding can be achieved where the flow is between 110% and 300% of the original width of the mat.

The molding plate or die 20 is moved towards the material to be molded, as indicated by the arrow 21, and heat (from a source not shown) and pressure required for molding is applied to the mats and strands. Although the dies or molds 14 and 20 are made in a great variety of shapes, the plates 14 and 20 are shown with a rectangular shape for reasons of simplicity of illustration.

When the resinous material is heated to the desired temperature and the required molding pressure is applied, the resin in mats 10, 11 and 12 and in parallel strand layer 18 is softened and together with its glass fiber content begins to flow. As shown in FIG. 1, the strands of glass fiber are unidirectionally oriented or aligned. Flow is in the direction perpendicular to the alignment of the fibers 18, i.e. in the direction transverse to their longitudinal axes.

Figure 2:
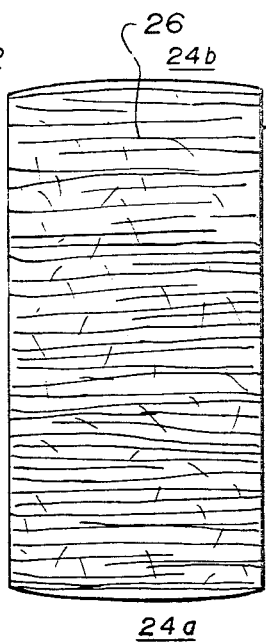
FIG. 2 is a plan view of a slab molded from a glass reinforced preimpregnated mat in accordance with this invention; and, FIG. 3 is a perspective view of a U-shaped channel manufactured in accordance with the method embodying the invention.

To further illustrate the control in the direction of flow of the resinous material during molding, a slab 22 (shown in FIG. 2) is illustrated that is typical of one that has been molded by the present techniques such as that of FIG. 1. The molding plates 14 and 20 do not present any barriers to the flow of the material in any direction within the plane defined between the plates 14 and 20. As shown in FIG. 2, however, the resinous material (from mats such as 10, 11 and 12) as well as strands 26 and associated resin are restricted to flow towards 24a and 24b substantially transverse to the direction of alignment of the fiber glass strands 26. Longitudinal flow of resinous material is minimal. The starting slab 22, before molding, may have been only one third of the dimension shown in the end product between 24a and 24b.

Figure 3:
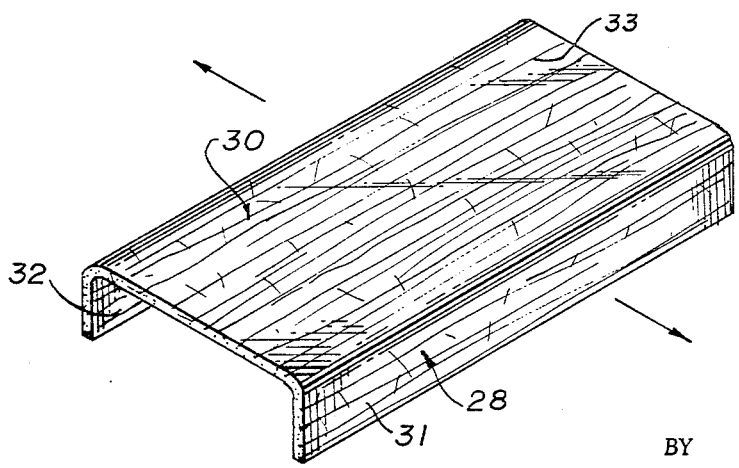

A channel 28 having a U-shaped cross-sectional area is shown in FIG. 3 to exemplify an article of manufacture wherein unidirectional resin flow control is important. The channel 28 is molded by mating a predetermined number of preimpregnated mats and a corresponding number of layers of unidirectionally disposed fiber glass strands in the manner described above. The channel 28 may be molded to the desired U-shape by means of a pair of matching molding plates or dies (not shown) having a similarly U-shaped cross-sectional area. In this case, one of the U-shaped molding plates is adapted to fit into the other so that the preimpregnated mats and strands are molded between the internal concave surface of the larger molding plate and the external convex surface of the smaller molding plate.

With the U-shape of the molding plates and products sought, it is desirable to be able to place the raw materials in the mold so that they occupy only the portion which forms the bottom 30 of the channel 28. Flow during the molding is utilized to form the legs 31 and 32 of the channel. Thus, by laying out the strands of glass fibers 33 in alignment with the longitudinal axes of the channel 28, the resinous material from mats such as 10, 11 and 12 in FIG. 1, together with the glass fibers 33 and associated resin, flow under heat and pressure substantially exclusively outwardly in the direction of the arrows to fill the spaces of the mold that form the legs 31 and 32. Longitudinal flow along the fibers 33 is minimal.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A method for providing unidirectional flow control of a glass fiber reinforced resin impregnated material during molding comprising the steps of: providing a preimpregnated mat comprising molding resin mixed into a reinforcement mat of chopped strands of randomly dispersed glass fibers, placing said preimpregnated mat into a die cavity the size of which is larger than the size of the mat so that there is a mat-free area adjacent said mat, placing a plurality of glass fiber strands in substantially parallel alignment on said mat said strands being aligned so that the mat-free area is contiguous to a parallel edge of the strands, and applying sufficient heat and pressure to the contents of said die to cause the mat components and the strands to flow into said mat-free area.

2. A method for manufacturing glass fiber reinforced resin articles comprising the steps of providing at least a first layer of randomly-oriented glass fiber strands impregnated with heat curable resin having a viscosity between 20,000 and 20,000,000 cps., the resin content of said layer being within a range of 20% to 80%, then placing at least one additional layer comprising a plurality of substantially parallel glass fiber strands coated with heat curable resin on said first layer, then compressing said layers together so that said first layer and said second layer are displaced substantially only in a direction transverse to the longitudinal axis of said parallel strands, said displacement resulting in a product having a width from between 110% and 300% of the original width of the first layer.

References Cited

UNITED STATES PATENTS

| | | | |
|---|---|---|---|
| 1,370,597 | 3/1921 | Lambert | 156—161 |
| 2,771,387 | 11/1956 | Kleist et al. | 156—62.8 |
| 2,881,110 | 4/1959 | Walker et al. | 154—110 |
| 2,917,421 | 12/1959 | Miller | 161—78 |
| 3,244,570 | 4/1966 | Boggs | 264—137 |
| 2,927,623 | 3/1960 | Huisman et al. | 156—200 |
| 2,731,066 | 1/1956 | Hogendobler et al. | 156—62.8 X |
| 2,870,793 | 1/1959 | Bailey. | |
| 3,109,763 | 11/1963 | Finger | 156—276 |

EARL M. BERGERT, *Primary Examiner.*

R. A. KILLWORTH, *Assistant Examiner.*